No. 622,972. Patented Apr. 11, 1899.
W. A. OVERBECK.
AUTOMATIC PACKAGE FILLER.
(Application filed Jan. 17, 1898.)
(No Model.)

WITNESSES:
Edward Thorpe
H. L. Reynolds

INVENTOR
W. A. Overbeck.
BY
ATTORNEYS.

UNITED STATES PATENT OFFICE.

WILLIAM ALPHONSO OVERBECK, OF OMAHA, NEBRASKA.

AUTOMATIC PACKAGE-FILLER.

SPECIFICATION forming part of Letters Patent No. 622,972, dated April 11, 1899.

Application filed January 17, 1898. Serial No. 666,956. (No model.)

*To all whom it may concern:*

Be it known that I, WILLIAM ALPHONSO OVERBECK, of Omaha, in the county of Douglas and State of Nebraska, have invented a new and Improved Automatic Package-Filler, of which the following is a full, clear, and exact description.

My invention relates to an improvement in devices intended for automatically filling packages, such as cans, with syrup, oils, &c., or for filling packages with sugar or meal or, in fact, with any article which will flow in a manner similar to meal or syrup; and the invention consists of certain improved constructions which will be hereinafter described and claimed.

Reference is to be had to the accompanying drawings, forming a part of this specification, in which similar characters of reference indicate corresponding parts in both figures.

Figure 1:
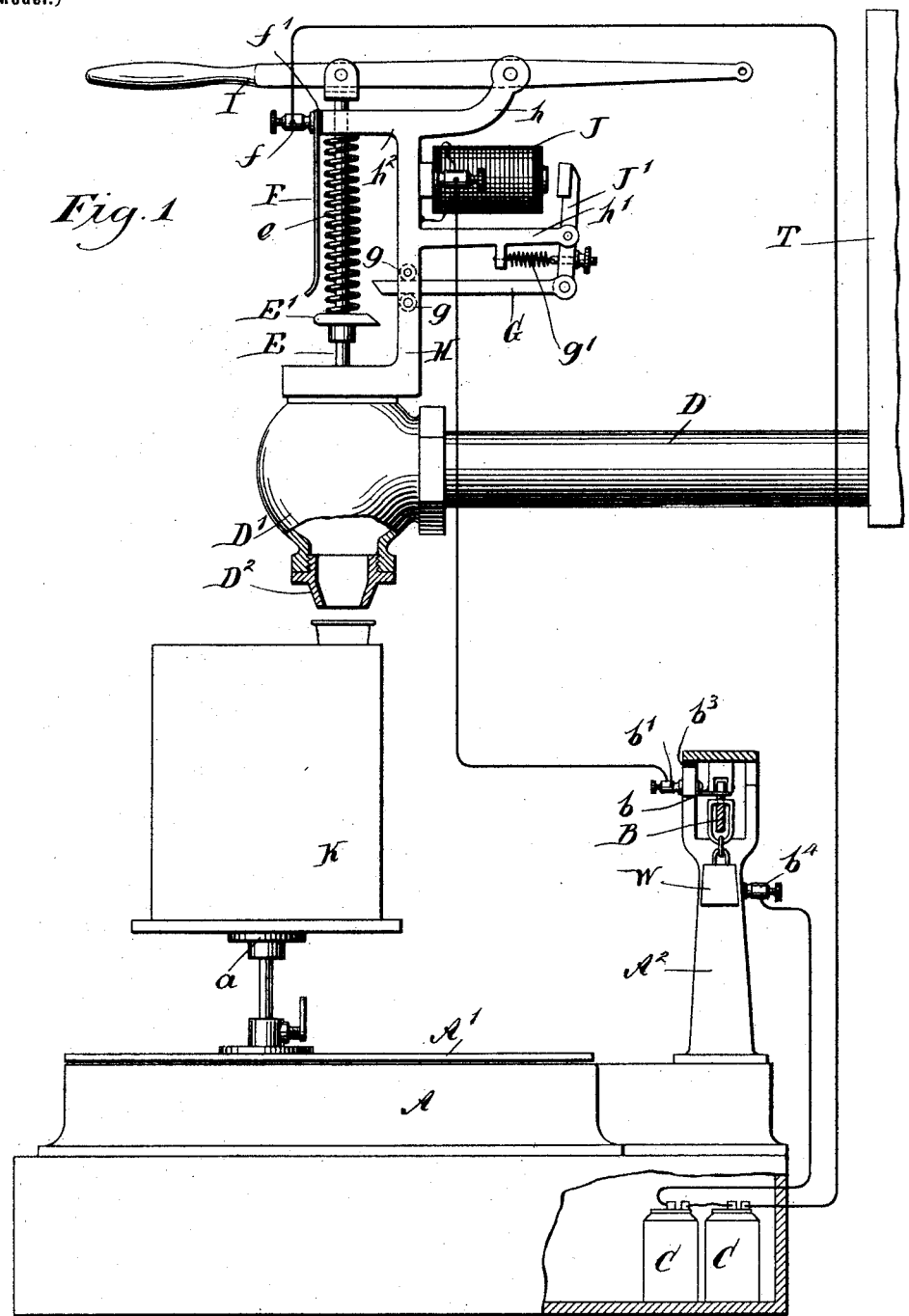
Figure 2:
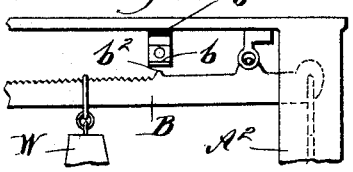

Figure 1 is a side elevation of my device, with certain parts in section to more clearly show the construction thereof; and Fig. 2 is a side elevation of a portion of the scale mechanism, showing the manner of closing the electric circuit.

One of the objects particularly sought to be obtained with my device is to produce a mechanism for accomplishing the purposes hereinbefore mentioned in such a manner that the friction of the parts will influence the result as little as possible and thus to insure great accuracy in its work. This is accomplished by using an electromagnet and a battery for releasing the valve-closing mechanism and operating said magnet by a contact caused by the upward swing of the scale B.

Another object sought to be obtained in connection with this device is to break the electric circuit through the operating-magnet as soon as the valve-closing mechanism has been released, thus using the battery as little as possible and preserving its strength.

In the drawings a tank T is shown, which contains the material to be measured and placed in the packages. This tank is connected by a pipe D with any suitable valve, as D'. My device, as shown in the drawings, is adapted for use in connection with syrups or liquids. The principle of its operation may, however, be as well applied to any substance which will flow in the manner of liquids or semifluids—such, for instance, as sugar, meal, or any granular substance. While the mechanism shown and described is that adapted for use with liquids, it is to be understood that the principal points of its construction are as well adapted for use with semifluid or granular material.

The valve-body D' in the connection in which it is shown in the drawings is that of an ordinary globe-valve or a valve which is closed by the downward movement of its valve-stem E. For convenience, the lower end of the valve is shown as being provided with a nozzle $D^2$, which is screwed in place and reduces the opening in the base of the valve. Nozzles of different sizes may be inserted as desired to suit the requirements of different work.

The valve-stem E is provided above the valve with a collar or block E', which extends upon either side of the stem. One end of this collar is rounded and adapted to engage the spring-contact arm F, which is mounted at its upper end on the arm $h^2$ of the frame H, which frame is supported upon the valve-body D' or in any other suitable manner. The contact-arm F is insulated from the arm $h^2$ by a strip of insulating material $f'$.

A spirally-coiled spring $e$ surrounds the valve-stem E between the collar E' and the arm $h^2$, which spring normally acts to close the valve. The side of the collar E' opposite the contact-arm F is beveled and is adapted to engage the correspondingly-beveled end of the catch-bar G, mounted to reciprocate longitudinally between friction-rollers $g$ supported upon the frame H. The other end of the catch-bar G is pivoted to the armature-lever J', said armature-lever being pivoted upon an arm $h'$ extending from the frame H. An electromagnet J is mounted upon the frame H and adapted to act upon the armature-lever J', so as to withdraw the catch-bar G from the collar or block E'.

A hand-operated lever I is pivoted upon an arm $h$ of the frame H and is connected to the upper end of the valve-stem E. When the valve-stem and its valve are raised by elevation of the lever I, the beveled edge of the collar E' will engage the end of the catch-bar G and force it outward until the collar E' is above the catch-bar. The catch-bar will then be returned to its normal position by the action of the spring $g'$, the tension of which is regulated by a thumb-screw. The catch will then engage the under side of the collar $E'$ and support the valve in an elevated or open position. The material contained in the tank will thus be permitted to flow through the valve $D'$ and into the package K, said package being mounted upon a support $a$ resting upon the table or scale-pan $A'$ of the scale A.

The scale shown in Fig. 1 is an ordinary platform-scale. Any suitable form of scale or balance may, however, be substituted for the particular form shown in the drawings. In the scale shown the standard $A^2$ supports the scale-beam B, and upon this beam is the usual movable weight W, by which the scale is adjusted to the weight desired.

A contact-arm $b$ is supported from the scale-frame and extends over the scale-beam B, where it will be engaged by the contact-point $b^2$ upon said scale-beam. The contact-arm $b$ is connected by a binding-post $b'$ to a wire or suitable connection, which extends to one of the binding-posts of the electromagnet J. The contact-arm $b$ is insulated from the frame of the scale by means of a strip $b^3$ of insulating material interposed between the two.

The frame of the scale is provided with a binding-post $b^4$, adapted to receive a wire connecting the same with one side of the battery C, which is conveniently located in the base supporting the scale. The scale-beam B being electrically connected by its supports with the frame $A^2$ and binding-post $b^4$ is consequently electrically connected to the battery C. When the proper weight of material has been received in the package K, the scale will be depressed and the scale-beam B elevated, which will result in closing the circuit through the contact-point $b^2$ and the arm $b$. The collar, which at this time is supported upon the end of the catch-bar G, forms a portion of the circuit, said circuit including the spring-contact bar F, the collar $E'$, and the catch-bar G.

When the circuit has been closed at the scales in the manner described, the electromagnet J will attract the armature-lever $J'$. This will result in withdrawing the catch-bar G from beneath the collar $E'$. The spring $e$ will thus force the valve-stem E and its attached valve downward, thus cutting off the supply of material. At the same time the circuit is broken by the removal of the collar $E'$, which forms an essential part thereof. This results in breaking the electric circuit as soon as the electromagnet has released the valve-closing means. In consequence there is very little call upon the battery for energy, and that only for an instant. It will consequently remain in working condition for a long time. The electric connection from the collar $E'$ to the magnet J may be either through the catch-bar G and frame H or through the valve-stem E and said frame. It is of course understood that one side of the electromagnet J is directly connected to the frame. This may, however, be varied by connecting the electromagnet directly with the valve-stem E or collar $E'$. The other construction is, however, thought to be preferable.

When the package K has been filled, it is removed and another package placed in position for filling. The lever I is then elevated, which opens the valve and places the parts in position for automatic work as soon as the package has been filled. With this device it will be possible to have one person look after a number of package-fillers, and thus render the cost of operating these devices very small.

Having thus described my invention, I claim as new and desire to secure by Letters Patent—

1. An automatic package-filler, comprising a scale adapted to support the package during filling, a valve adapted to control the discharge of the material and provided with normally-operative closing means, projections upon the valve-stem, an insulated contact-bar adapted to engage one of the valve-stem projections when the valve is opened, a catch adapted to engage one of the valve-stem projections to hold the valve open, an electric circuit including a weight-moved member of the scale, a fixed stop for engagement with said weight-moved member when the scale is depressed, and a magnet in said circuit adapted to release the catch and permit the valve to close, substantially as described.

2. An automatic package-filler, comprising a scale adapted to support the package during filling, a spring-pressed valve adapted to control the discharge of the material and provided with a projection on its stem, a catch for engaging the projection of the valve-stem to hold the valve open, an electromagnet operatively connected to said catch to release it, a circuit for said magnet normally open at the scale and closed by the depression of the scale, and means for breaking the circuit by the closing of the valve, substantially as described.

3. An automatic package-filler, comprising a scale adapted to support the package while filling, a valve adapted to control the discharge of the material and having a longitudinally-reciprocating stem, means acting on said valve to close it, an insulated contact-bar extending parallel with the valve-stem, a catch adapted to hold the valve open, an electromagnet operated to withdraw said catch, a side projecting arm upon the valve-stem adapted when the valve is open to engage the contact-bar and also to have electrical connection with the magnet, and comprising a portion of a circuit, said circuit being normally open at the scale, and means for closing the circuit by the depression of the scale, substantially as described.

4. An automatic package-filler, comprising a scale adapted to support the package while filling, a valve adapted to control the discharge of the material, and having a longitudinally-reciprocating stem, a spring surrounding the stem and acting to close the valve, a collar on said stem adapted to engage the contact-bar, an insulated contact-bar extending parallel with the valve-stem, a catch-bar having a beveled end adapted to engage said collar to hold the valve open, an electromagnet having its armature-lever connected with said catch-bar, said collar and contact-bar forming a part of the circuit of the magnet, said circuit being normally open at the scale, and means for closing the circuit by the depression of the scale, substantially as described.

5. An automatic package-filler, comprising a scale adapted to support the package while filling, a valve adapted to control the discharge of the material, and having a longitudinally-reciprocating stem, a spring surrounding the stem and acting to close the valve, a collar on said stem, an insulated contact-bar extending parallel with the valve-stem, and adapted to engage the collar when the valve is open, a catch-bar having a beveled end adapted to engage said collar to hold the valve open, an electromagnet having its armature-lever connected with said catch-bar, said collar and contact-bar forming a part of the circuit of the magnet, a fixed contact-point connected in the circuit and adapted to engage said point in its swing to close the magnet, substantially as described.

6. An automatic filler, comprising a scale adapted to support the package during filling, a valve adapted to control the discharge of the material, and provided with normally-operative closing means, a hand-operated lever connected with the valve for opening it, projections upon the valve-stem, an insulated contact-bar adapted to engage one of the valve-stem projections when the valve is open, a catch adapted to engage one of said projections to hold the valve open, an electric circuit including a weight-moved member of the scale, a fixed stop for engagement therewith when the scale is depressed, and a magnet in said circuit adapted to release the catch, and permit the valve to close, substantially as described.

WILLIAM ALPHONSO OVERBECK.

Witnesses:
ROBT. A. MORISON,
G. FOSTER MEIGS.